(12) United States Patent
Lago Rivera et al.

(10) Patent No.: US 12,457,044 B2
(45) Date of Patent: Oct. 28, 2025

(54) QUANTUM PHASE COMPENSATION

(71) Applicant: Fundacio Institut de Ciencies Fotoniques, Barcelona (ES)

(72) Inventors: Dario Lago Rivera, Barcelona (ES); Samuele Grandi, Barcelona (ES); Hugues De Riedmatten, Barcelona (ES)

(73) Assignee: FUNDACIÓ INSTITUT DE CIENCIES FOTONIQUES, Barcelona (ES)

( * ) Notice: Subject to any disclaimer, the term of this patent is extended or adjusted under 35 U.S.C. 154(b) by 215 days.

(21) Appl. No.: 18/170,453

(22) Filed: Feb. 16, 2023

(65) Prior Publication Data
US 2023/0269004 A1 Aug. 24, 2023

(30) Foreign Application Priority Data

Feb. 18, 2022 (EP) .................................... 22382138

(51) Int. Cl.
*H04B 10/70* (2013.01)
(52) U.S. Cl.
CPC .................. *H04B 10/70* (2013.01)
(58) Field of Classification Search
CPC ...................................................... H04B 10/70
See application file for complete search history.

(56) References Cited

U.S. PATENT DOCUMENTS

| 2009/0022322 | A1 | 1/2009 | Trifonov |
| 2016/0233964 | A1 | 8/2016 | Frohlich et al. |
| 2020/0382219 | A1* | 12/2020 | Innes ............... H04W 12/04 |
| 2021/0058163 | A1 | 2/2021 | Reilly |
| 2021/0295197 | A1* | 9/2021 | Gidney ............ H04B 10/70 |

FOREIGN PATENT DOCUMENTS

| CN | 113961952 A | 1/2022 | |
| GB | 2534918 A | 8/2016 | |
| JP | 2012004955 A | 1/2012 | |
| WO | WO2023068713 | * 4/2023 | ............ H04M 13/03 |

OTHER PUBLICATIONS

Nemoto K, Trupke M, Devitt SJ, Scharfenberger B, Buczak K, Schmiedmayer J, Munro WJ. Photonic Quantum Networks formed from NV(-) centers. Sci Rep. May 24, 2016; 6:26284. doi: 10.1038/srep26284. (Year: 2016).*

(Continued)

*Primary Examiner* — Nathan M Cors
(74) *Attorney, Agent, or Firm* — McCoy Russell LLP

(57) ABSTRACT

The invention provides an apparatus for quantum communication in a quantum network configured to create an entangled pair of quantum information carriers comprising a first quantum information carrier and a second quantum information carrier, transmit the first quantum information carrier to a remote device, store the second quantum information carrier in a quantum memory, receive, from the remote device, information about a phase correction related to the transmission of the first quantum information carrier, and apply the phase correction to the second quantum information carrier.

19 Claims, 5 Drawing Sheets

(56) References Cited

OTHER PUBLICATIONS

Pompili, M. et al., "Realization of a multi-node quantum network of remote solid-state qubits," arXiv Cornell University Website, Available Online at https://arxiv.org/abs/2102.04471, Available as Early as Feb. 8, 2021, 28 pages.
European Patent Office, Extended European Search Report Issued in Application No. 22382138.0, Aug. 17, 2022, Germany, 9 pages.
State Intellectual Property Office of the People's Republic of China, Office Action and Search Report Issued in Application No. 202310129814.4, Jul. 23, 2025, 30 pages. (Submitted with Partial Translation).

* cited by examiner

QUANTUM PHASE COMPENSATION

CROSS-REFERENCE TO RELATED APPLICATION

The present application claims priority to European Patent Application No. 22382138.0 filed on Feb. 18, 2022. The entire contents of the above-listed application are hereby incorporated by reference for all purposes.

FIELD OF THE INVENTION

The present invention relates to an apparatus and a method for compensating phase shifts, in particular in quantum communication. In particular, the present invention concerns entanglement distribution protocols in quantum networks that rely on the phase acquired by entangled modes as they propagate through the quantum network.

BACKGROUND

In recent years, the rapid developments in quantum computing and quantum communication have led to the development of quantum networks, i.e., networks that use quantum communication as a means to transfer quantum information from one node of the network to another node of the network. Quantum networks can, e.g., be used to link several quantum computers or to transfer information securely over large distances. Quantum networks typically comprise at least two nodes between which the quantum information is to be exchanged. These nodes can, for example, be quantum computers, quantum memories or quantum simulators.

In operation, one of the nodes, referred to as sender, creates a physical system in an entangled state. The entangled state comprises two or more modes, one of which is kept locally at the sender, while one of the other modes is transferred to the second node, referred to as receiver. Due to the two modes being part of the same entangled state, non-classical correlations will appear between the two modes regardless of the distance between them. This property can be exploited to transfer information, through what is also known as "quantum teleportation". Here and in the following, the modes of the entangled state are also referred to as quantum information carriers. For various reasons, which are explained in the following, the transmission from sender to receiver is not necessarily a direct transmission. Instead, it involves further nodes in the quantum network.

As explained above, quantum communication requires that one of the quantum information carriers is transferred from the sender to the receiver. Thus, one of the limits for the range of quantum communication are losses in the transfer channel for the quantum information carrier. Therefore, quantum repeaters have been developed for signal boosting in quantum networks. Quantum repeaters use the concept of entanglement swapping in order to create an entangled state at the sender and the receiver, even if these two are located too far apart to directly transfer one quantum information carrier from the sender to the receiver.

In its most basic form, a quantum repeater connects two nodes of a quantum network via a central station. The central station will be described in more detail further below. In the following, such a basic quantum repeater will also be referred to as "one-link quantum repeater". However, it is also possible that a quantum repeater comprises multiple one-link quantum repeaters chained together.

In the following, the concept of entanglement swapping will be briefly explained using the example of qubits as quantum information carriers. Qubits can be represented by any two-state or two-level quantum mechanical system. As such, mathematically, the state of one qubit is expressed as a superposition of its base states, which, for example, may be denoted by $|0\rangle$ and $|1\rangle$. In practice, qubits are often represented by photons or photonic modes. In that case, the base states may, for example, correspond to either full vertical or full horizontal polarization, the Fock state of a photonic mode, or the emission time of the photons. A number of other properties of the photons could be used to represent the base states of a qubit. On the one hand, it is comparably easy to create photons in large numbers, i.e., by means of a laser. On the other hand, it is also possible to generate single photons by more complicated systems, such as emission from excited single atoms or ions, or crystals. As such, photons can be generated in a wide variety of modes which are suitable for representation of quantum information. However, it should be noted that the general principles of the present invention are not limited to photonic qubits as quantum information carriers.

While the following explains the operation of a one-link quantum repeater, it applies also to the case where a quantum repeater consists of several one-link quantum repeaters chained together.

For the process of entanglement swapping, entangled states comprising a pair of qubits i and s are generated both at the node A (sender) and at the node B (receiver) of a quantum repeater. As is known, the resulting entangled states will each include a phase factor $\Phi$ indicating a phase difference between the qubits of the entangled state.

In operation, one of the qubits, for example qubit i, is transmitted from both nodes A and B of the quantum repeater to the central station of the quantum repeater, which is located between the sender and the receiver. The qubit s is stored at the respective nodes. At the central station, a Bell state measurement on the qubits i is performed, causing the qubits s that were stored at the nodes A and B to become entangled. Mathematically, the entangled state at the two, spatially separated, nodes A and B can then be written as follows:

$$\alpha|0_{s,A}1_{s,B}\rangle + e^{i\Delta\theta}\beta|1_{s,A}0_{s,B}\rangle$$

Here, $\Delta\theta$ denotes $\Phi_A - \Phi_B$, i.e., a phase difference between the two entangled states at the time of the Bell state measurement at the central station. In order to establish a functional communication protocol between the sender and the receiver, in particular if the protocol is sensitive to the phase acquired by the entangled state, $\Delta\theta$ has to be constant during all the repetitions that the communication process needs. However, in practice, this value may shift and the qubits i may experience phase fluctuations $\Delta\theta_{i,noise}$ on their way to the central station. These fluctuations can, for example, originate from environmental sources such as vibrations.

In order to keep $\Delta\theta$ constant, it has been proposed (M. Pompili, S. L. N Hermans, S. Baier et. al., "Realization of a multinode quantum network of remote solid-state qubits", Science, Vol. 372, Issue 6539, pp. 259-264, DOI: 10.1126/science.abg1919), to determine $\Delta\theta_{i,noise}$ at the central station by measuring the phase difference between laser pulses originating at the sender and at the receiver. This information is then used to apply a correction at an optical fiber which is used to transmit the qubit i either from the sender or the receiver to the repeater. However, this method still has drawbacks, since it requires the measurement of $\Delta\theta_{i,noise}$ before the correction can be applied to the qubit i. As such, the communication rate, or bandwidth, is limited. Further, it is possible that the qubit i experiences additional fluctuations which result in a different from the $\Delta\theta_{i,noise}$ which has been determined with the measurement of the laser pulses. Additionally, applying the correction at an optical fiber may require additional devices that reduce the overall transmission rate of the system.

It is therefore the object of the present invention to provide an apparatus and method for an improved compensation of quantum phase shifts.

SUMMARY OF THE INVENTION

This object is achieved with an apparatus for quantum communication in a quantum network as disclosed herein. The apparatus is configured to create an entangled pair of quantum information carriers comprising a first quantum information carrier and a second quantum information carrier, transmit the first quantum information carrier to a remote device, store the second quantum information carrier in a quantum memory of the apparatus, receive, from the remote device, information about a phase correction related to the transmission of the first quantum information carrier, and apply the phase correction to the second quantum information carrier.

The remote device may be a central station of a quantum repeater. The apparatus may be a node of a quantum repeater. The quantum repeater may comprise one or more nodes and one or more central stations, wherein a central station links two nodes. The apparatus may, in particular, be connected to a quantum computer and/or a quantum memory and/or a quantum simulator. It may also be part of a quantum computer and/or a quantum memory and/or a quantum simulator.

As mentioned above, a quantum information carrier is any entity, which can be used to exchange quantum information between two remote places. In particular, it may refer to any mode of an entangled quantum system that can either be transmitted from one device to another device or be stored in a quantum memory. While the invention will be explained with reference to qubits as quantum information carriers, in particular qubits represented by photons, it is to be understood that it is not limited thereto.

The information about the phase correction may be the magnitude of the phase correction. The phase correction may, in particular, be a phase correction that is required for maintaining a constant phase between two end nodes of a quantum network during quantum communication.

A quantum memory is a device, which is configured to store a quantum information carrier. It is to be noted that, while the quantum memory stores the quantum information carrier, e.g., a qubit, it is not necessary that it stores the physical entity representing the qubit, e.g., a photon. A quantum memory can, for example, comprise a crystal doped with rare earth ions. A quantum memory may also include a solid-state device comprising point defects, in particular F- or color centers. In particular, a quantum memory may comprise a diamond comprising such point defects. Other embodiments of quantum memories may comprise ensembles of atoms that are laser cooled, or warm vapours. However, it is also possible to directly store photons, for example in spools of optical fibers and/or mirror assemblies.

Accordingly, here and in the following, the expression "storing a quantum information carrier" comprises both the storage of the physical entity, which represents the quantum information carrier, e.g., a photon, and the storage of the quantum state carried by the physical entity.

The first quantum information carrier may be transmitted from the apparatus to the remote device by any suitable means. For example, if the first quantum information carrier is or is represented by a photon, it may be transmitted to the remote device via an optical fiber. It is also possible that the photon is directly transmitted through free space. For example, the photon may be directly transmitted from an apparatus located on a satellite or spacecraft in space to a remote device located on another satellite or spacecraft. Another possibility is the direct transmission through free space from a ground-based apparatus to a spacecraft and vice versa. A direct transmission of photons through free space, either from space to space, from ground to space, or from space to ground, will also be referred to as a free space link hereinafter. It is to be noted that the atmosphere is considered to be free space in this context.

The phase correction may be applied to the second quantum information carrier by any suitable means. In particular, one or more electromagnetic pulses may be applied to the second quantum information carrier in order to apply the phase correction. In particular, the phase correction may be applied directly to the second quantum information carrier. This direct application is in contrast to applying it indirectly via the first quantum information carrier by stabilizing or applying the correction to the transfer channel.

The apparatus may receive the information about the phase correction via an optical signal. Alternatively or additionally, the apparatus may receive the information about the phase correction via an electrical signal transmitted via a wired or wireless connection. In particular, the apparatus may receive the information about the phase correction via the same transmission channel, which is used to transmit the first entangled quantum information carrier to the remote device.

Thus, in contrast to the prior art devices, the phase correction is applied to the second quantum information carrier, i.e., the quantum information carrier, which remains locally at the site of the apparatus. This has the advantage that it is not necessary to wait for the determined phase correction before transmitting each first quantum information carrier to the remote device with the appropriate correction. As such, the apparatus according to the invention is capable of a higher communication rate.

The apparatus may be configured to apply the phase correction to the second quantum information carrier while the second quantum information carrier is stored in the quantum memory. Generally, this may comprise applying one or more electromagnetic pulses to the second quantum information carrier while it is stored in and/or being retrieved from the quantum memory. The concrete implementation will depend on the type of quantum memory used. However, suitable methods for altering the phase of a quantum information carrier stored in a quantum memory as such are known in the art. For example, it is possible that the storage and retrieval of the second quantum information carriers from the quantum memory comprises applying one or more electromagnetic pulses. In that case, the electromagnetic pulses may be suitable adjusted in phase or amplitude, to impart the phase correction to the stored information. For example, if the quantum memory comprises a crystal doped with rare earth ions, applying the phase correction may comprise changing the relative phase between control pulses in the quantum memory. If the quantum memory comprises a diamond comprising point defects, in particular, nitrogen-vacancy (NV) centers, applying the phase correction may comprise changing the phase of microwave pulses used to control the quantum memory.

Applying the correction to the second quantum information carrier while the second quantum information carrier is stored in and or being retrieved from the quantum memory has the advantage that losses in the system can be reduced. This is because it is possible to use a process that would be performed anyway, such as applying a control pulse to the quantum memory, in order to apply the phase correction. As such, no additional devices that each have a limited efficiency have to be introduced into the system.

Alternatively, the apparatus may be configured to apply the phase correction to the second quantum information carrier when the second quantum information carrier has been retrieved from the quantum memory. In particular, this may comprise using a phase modulator on the second quantum information carrier. For example, the phase correction may be applied by using an acousto-optic modulator (AOM), an electro-optic modulator (EOM), an optical fiber patch that is mechanically stretched, using, for example, a piezoelectric actuator, or the like. Applying the phase correction to the second quantum information carrier after the second quantum information carrier has been retrieved from the quantum memory has the advantage that it is a more straightforward implementation, which is not dependent on the type of quantum memory.

The quantum information carriers may be represented by one or more photons or photonic modes. The quantum information carriers may be qubits. In particular, creating the entangled pair of quantum information carriers may comprise generating an entangled state of the two quantum information carriers, wherein the entangled state is expressed using one or more of the possible base states of the entangled pair. For example, the base states may be the Fock states of the entangled modes or the polarizations of the entangled photons. It is also possible that the entangled state is a Bell state.

Using photons or photonic modes to represent the quantum information carriers has the advantage that it makes it easy to create entangled quantum information carriers. Further, photons can be transmitted over large distances with high speed and ease. Also, losses can be kept low, in particular, if the photons have a wavelength as used in optical telecommunication, i.e., a wavelength between 1260 nm and 1675 nm. For example, by using optical fibers, the transmission paths can be nearly arbitrary. For generating the entangled photons, the apparatus may comprise a source for coherent light, in particular a laser.

The apparatus may be further configured to transmit non-entangled photons to the remote device, wherein the information about the phase correction is determined by the remote device based on the non-entangled photons transmitted from the apparatus to the remote device. In particular, the apparatus may be configured to transmit a plurality of classical pulses of light comprising non-entangled photons to the remote device. If the quantum information carriers are represented by photons, the apparatus may be configured to generate the non-entangled photons with the same source, in particular a laser.

The remote device may be configured to measure the relative phase between one of the classical pulses of the light comprising non-entangled photons received from the apparatus and a further classical pulse of light comprising non-entangled photons from another node in a quantum network. For example, the remote device may be configured to use an interferometer to determine the relative phase.

The wavelength of the non-entangled photons may be determined based on the wavelength of the photon representing the first quantum information carrier. In particular, the wavelength of the non-entangled photons may be the same as the wavelength of the photon representing the first quantum information carrier. Thus, the measured phase difference will be very similar, or identical, to the phase shift experienced by the first quantum information carrier. Thus, the precision of the phase correction can be improved. The wavelength of the non-entangled photons and/or the photon representing the first quantum information carrier may be between 1260 nm and 1675 nm. Such a wavelength may be particularly advantageous if an optical fiber is used as transmission means for the first quantum information carrier and/or the non-entangled photons. However, the present invention is not restricted to this waveband.

The apparatus may be configured to transmit the first quantum information carrier and the non-entangled photons to the remote device via the same communication channel, in particular the same optical fiber or free space link. Thus, the first quantum information carrier and the non-entangled photons may be subject to the same outside influences, and thus experience the same phase shifts. This may further enhance the precision of the phase correction.

The apparatus may be configured to send non-entangled photons and first quantum information carriers in an alternating manner. In particular, the non-entangled photons, which are used to determine the phase correction, may be sent in close temporal proximity to the first quantum information carriers. In particular, the time between sending the first quantum information carriers and sending the non-entangled photons may be less than 5s, preferably less than 1s. This way, the likelihood that the non-entangled photons and the first quantum information carriers are subject to the same outside influences may be further increased, and the precision of the phase correction may be further enhanced.

Further, the time between sending the first quantum information carriers and sending the non-entangled photons may be adjusted based on information associated with the transmission of the first quantum information carrier and/or the non-entangled photons, in particular based on information associated with noise that the first quantum information carriers and the non-entangled photons are exposed to during transmission. This information may, for example, be determined based on the received information about the phase correction related to the transmission of the first quantum information carrier. For example, if the information indicates that the noise is large, the time between sending the first quantum information carriers and sending the non-entangled photons may be decreased. On the other hand, if the information indicates that the noise is small, the time between sending the first quantum information carriers and sending the non-entangled photons may be increased. In this way, the resources of the network may be used efficiently while maintaining a high degree of precision for the phase correction.

The invention further provides a method for quantum phase compensation.

The method comprises creating, by a first device, an entangled pair of quantum information carriers comprising a first quantum information carrier and a second quantum information carrier, transmitting, from the first device to a second device, the first quantum information carrier, storing, by the first device, the second quantum information carrier in a quantum memory, receiving, by the first device, information about a phase correction related to the transmission of the first quantum information carrier, and applying, by the first device, the phase correction to the second quantum information carrier.

In particular, the first device may be an apparatus as described above, and may have one or more of the features described above.

Applying the phase correction to the second quantum information carrier may comprise applying the phase correction to the entangled quantum information carrier while the second quantum information carrier is stored in the quantum memory.

Alternatively, applying the phase correction to the entangled quantum information carrier may comprise applying the phase correction to the second quantum information carrier when the second quantum information carrier is being retrieved from the quantum memory.

The quantum information carriers may be represented by photons or photonic modes. The quantum information carriers may be qubits. In particular, creating the entangled pair of quantum information carriers may comprise generating an entangled state of the two quantum information carriers, wherein the entangled state is expressed using one or more of the possible base states of the entangled pair. For example, the base states may be the Fock states of the entangled modes or the polarizations of the entangled photons. It is also possible that the entangled state is a Bell state.

The method may further comprise transmitting, from the first device to the second device, non-entangled photons, and determining, by the second device, the information about the phase correction based on the non-entangled photons transmitted from the first device to the second device.

The wavelength of the non-entangled photons may be determined based on the wavelength of the photon representing the first quantum information carrier, in particular wherein the wavelength of the non-entangled photons is the wavelength of the photon representing first quantum information carrier.

In particular, the quantum information carriers and the non-entangled photons may be generated using the same means, in particular wherein the means comprise one or more lasers.

The first quantum information carrier and the non-entangled photons may be transmitted from the first device to the second device via the same communication channel, in particular the same optical fiber or free space link.

The method may further comprise sending non-entangled photons and first quantum information carriers in an alternating manner.

The invention further provides a system comprising at least one one-link quantum repeater, the one-link quantum repeater comprising a first apparatus as a first node of the one-link quantum repeater, a second apparatus as a second node of the one-link quantum repeater, and a device as a central station of the one-link quantum repeater. The device is configured to receive non-entangled photons from the first node and the second node, perform an interferometry measurement using the non-entangled photons received from the first node and the second node, and to transmit a result of the interferometry measurement to the first node and/or the second node. The device is further configured to receive a first quantum information carrier from the first node, receive a second quantum information carrier from the second node, and perform a Bell state measurement using the first and/or second quantum information carriers.

The first and/or the second apparatus may have one or more of the features described above.

Such a system may be efficiently used in a quantum network due to the enhanced quantum phase compensation performed in the first and/or second apparatus.

The system may further comprise additional apparatuses and devices as specified above. In particular, the apparatuses and devices may be provided such that a quantum network is formed, in which each apparatus is part of a node, and in which the nodes are respectively connected by a central station. In particular, the system may comprise a chain of quantum repeaters, each comprising two nodes and a central station.

The system may comprise a plurality of connected one-link quantum repeaters, wherein the plurality of one-link quantum repeaters is arranged in a chain. The system may be configured to:

perform entanglement procedure to entangle quantum information carriers stored at the first node and the second node of each one-link quantum repeater in the chain, perform an entanglement swapping procedure to entangle the quantum information carrier stored in the first node of a first one-link quantum repeater in the chain with a quantum information carrier stored in the second node of a neighboring one-link quantum repeater, repeat step b) until the quantum information carrier stored in the first node of the first one-link quantum repeater in the chain is entangled with the quantum information carrier stored in the second node of the last one-link quantum repeater in the chain.

The entanglement procedure of step a) may comprise performing a Bell state measurement at the central station of each one-link quantum repeater.

The entanglement swapping procedure of step b) may comprise performing a Bell state measurement using the quantum information carrier stored at the second node of the first one-link quantum repeater and the quantum information carrier stored at the first node of the neighboring one-link quantum repeater.

The term that the one-link quantum repeaters are connected is to be understood such that a link exists between the second node of one one-link quantum repeater and the first node of the neighboring one-link quantum repeater. In particular, it means that a Bell state measurement can be performed using quantum information carriers stored at the second node of one one-link quantum repeater and the first node of the neighboring one-link quantum repeater.

For example, the second node of one one-link quantum repeater may be located at the same location as the first node of the neighboring one-link quantum repeater. In this case, the entanglement swapping procedure of step b) may easily performed. However, it is also possible that the second node of one one-link quantum repeater is located at a remote location from the first node of the neighboring one-link quantum repeater. In this case, it is possible that the two nodes are connected via suitable communication links, such as optical fibers or a free space link. It is also possible that a device corresponding to the central station of a one-link quantum repeater is located between the two nodes.

BRIEF DESCRIPTION OF THE DRAWINGS

Advantageous embodiments will now be described in combination with the enclosed figures.

DETAILED DESCRIPTION OF THE INVENTION

Figure 1:
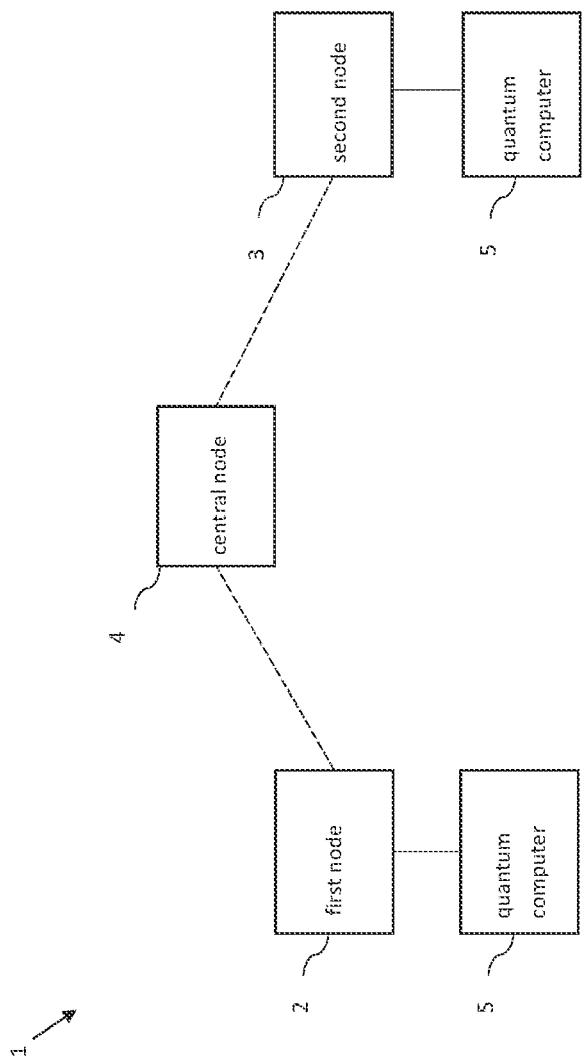
FIG. 1 schematically shows a quantum network.

FIG. 1 schematically shows a quantum network 1 in which the present invention may be used. The quantum network 1 comprises a first node 2, a second node 3, and a central node 4. In the illustrated embodiment, the first end node 2 and the second end node 3 are each connected to quantum computers 5. The nodes 2, 3, and 4 form a one-link quantum repeater, with the central node 4 being the central station of the quantum repeater. The node 2 and/or the node 3 may be an apparatus for quantum communication as described above. The dashed lines indicate that the nodes 2 and 3 can communicate with the central node 4.

Figure 2:
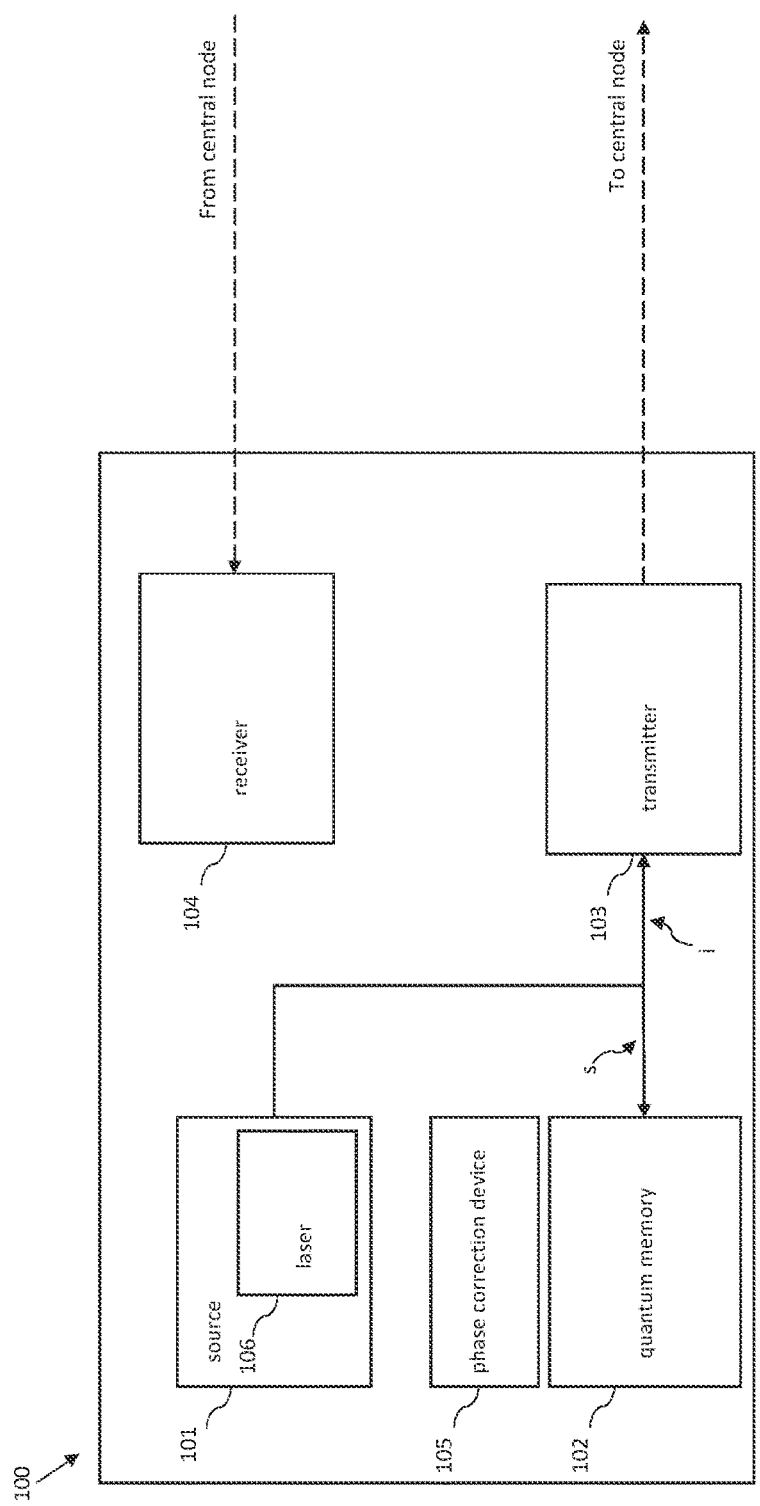
FIG. 2 schematically shows a node of a quantum network.

FIG. 2 schematically shows a node 100 of a quantum network. The node 100 may be one of the nodes 2 and 3 as illustrated in FIG. 1. The node 100 comprises a source 101 for entangled photon pairs, a quantum memory 102, a transmitter 103, a receiver 104, and a phase correction device 105.

The source 101 comprises one or more lasers 106. In addition to being used for the generation of entangled photon pairs, the laser 106 is also configured to generate classical optical pulses, i.e., pulses of non-entangled photons. The laser 106 may be configured to generate pulses with a duration from ten picoseconds to several hundred microseconds. Preferably, the laser 106 generates pulses with a duration of one microsecond.

The laser 106 may be modulated in amplitude and/or frequency. In particular, the node 100 may comprise a frequency modulator for modulating the wavelength of the laser 106. The frequency modulator may control the laser current and/or use an electro-optical and/or acousto-optical modulator to modulate the wavelength of the laser 106. The wavelength of the laser may be in the optical telecommunication regime, in particular between 1260 nm and 1675 nm. However, other wavelengths are also possible.

The quantum memory 102 is a device, which is able to store quantum states, in particular qubits, while preserving their properties. Examples of suitable quantum memories 102 are crystals doped with rare earth ions, solid-state devices or diamonds comprising point defects, ensembles of atoms that are laser cooled, or warm vapours. Other possible embodiments of the quantum memory 102 are, for example, spools of optical fibers and/or mirror assemblies.

The transmitter 103 is configured to transmit photons to a remote device, such as the central node 4 illustrated in FIG. 1. The receiver 104 is configured to receive information from a remote device, such as the central node 4 shown in FIG. 1. In the illustrated embodiment, the receiver 104 is a receiver for optical signals. However, the receiver 104 could also be a wired or wireless receiver for electronic signals.

The quantum phase correction device 105 is a device, which can apply a phase correction to a quantum information carrier. In particular, it is configured to apply a phase correction to the quantum information carrier s, which remains locally at the apparatus 100.

In one embodiment, the quantum phase correction device 105 can apply the phase correction to the quantum information carrier, s, while the quantum information carrier, s, is stored in the quantum memory 102. By way of example, if a nitrogen-vacancy (NV) center is used as quantum memory 102, the phase correction may be applied using appropriate microwave pulses. However, other types of quantum memories and according methods to apply the phase correction are possible.

In a further embodiment, the quantum phase correction device 105 applies the phase correction to the quantum information carrier, s, while the quantum information carrier, s, has been retrieved from the quantum memory 102. This may, for example, be achieved by using a phase modulator.

In operation, the source 101 generates entangled states comprising qubits s and i. In the illustrated embodiment, the qubits s and i are generated as a pair of entangled photons by the source 101. The qubit s is then stored locally at the node 100 in the quantum memory 102, and the qubit i is transmitted via the transmitter 103 to a remote device, e.g., the central node 4 shown in FIG. 1. The operation will be described in more detail with reference to FIG. 4 below.

Figure 3:
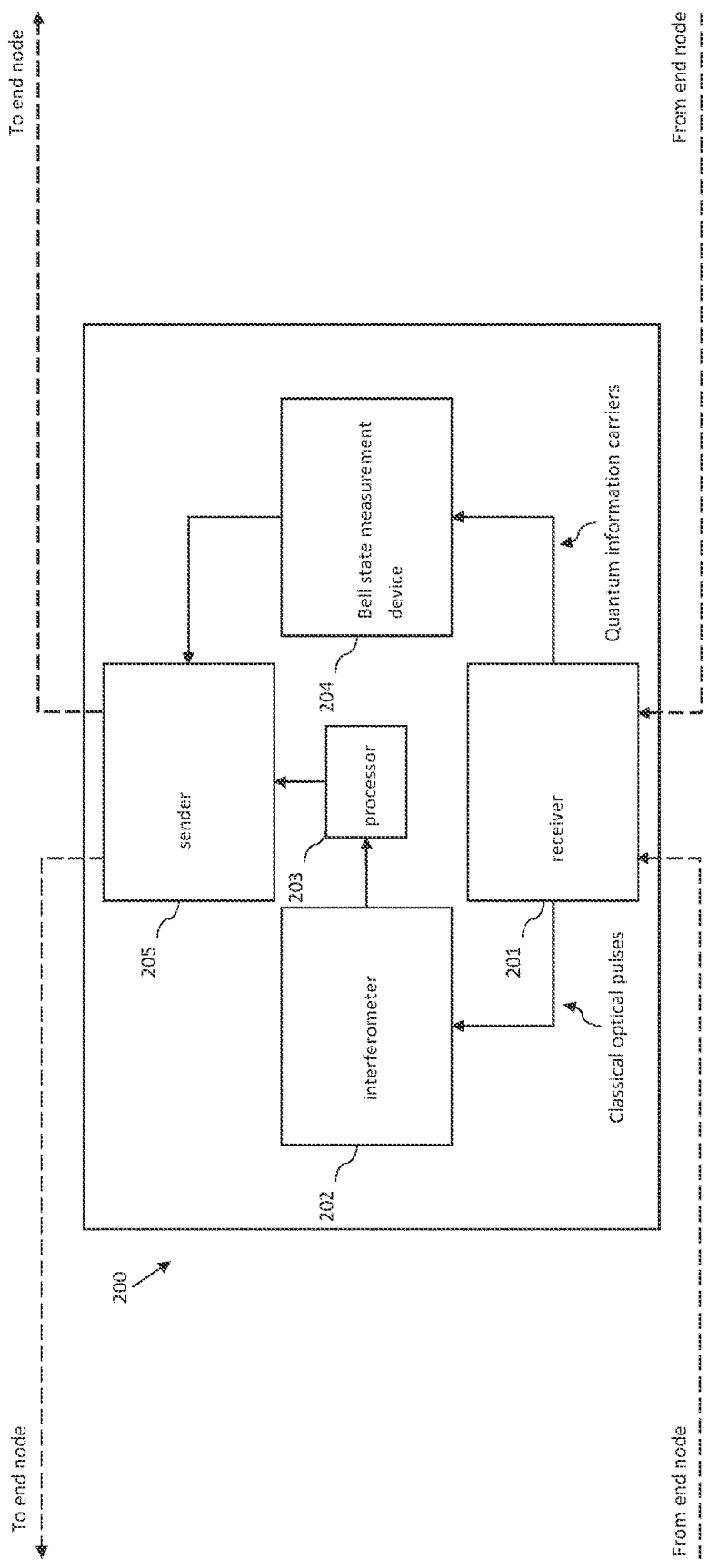
FIG. 3 schematically shows a central node of a quantum network.

FIG. 3 schematically shows a central node 200 of a quantum network. The central node 200 may correspond to the central node 4 shown in FIG. 1. It can be seen that the central node 200 comprises a receiver 201, an interferometer 202, a processor 203, a Bell state measurement device 204, and a sender 205.

The receiver 201 is configured to receive photons, in particular from other nodes in the quantum network, such as the nodes 2 and 3 shown in FIG. 1. The receiver 201 may receive photons representing quantum information carriers as well as classical photon pulses comprising non-entangled photons. The receiver 201 is configured to send photons representing quantum information carriers to the Bell state measurement device 204, and classical photon pulses to the interferometer 202.

The interferometer 202 is a device, which is configured to interfere classical photon pulses from two nodes in the quantum network and generate an interference pattern. The interferometer 202 may, for example, comprise a beam splitter. The processor 203 is configured to analyze the interference pattern generated by the interferometer 202 in order to determine a relative phase between the classical photon pulses from the two end nodes.

There are a number of ways to determine the relative phase, which are generally known in the art. For example, the central node 200 may communicate to one of the other nodes in the quantum network to modulate the frequency of its classical pulses of light with a reference radiofrequency. By analyzing the interference pattern based on the reference radiofrequency, the processor 203 may then determine the phase shift. Another possibility would be to use a phase modulator (not shown in FIG. 3) at the central node in order to modulate the phase of the arriving classical pulses of light from one of the end nodes. By scanning the phase and analyzing the influence on the interference pattern, it is also possible for the processor 203 to extract the relative phase. The processor 203 is further configured to transmit information about the relative phase, and, thus, a potential necessary phase correction to either of the end nodes via the transmitter 205.

The Bell state measurement device 204 is configured to perform a Bell state measurement on the quantum information carriers i, which are sent from the other nodes in the quantum network to the central node 200. The Bell state measurement device 204 can be any such device as generally known in the art. The Bell state measurement device 204 is further configured to transmit information about the result of the Bell state measurement to the end nodes via the transmitter 205.

The transmitter 205 is configured to transmit information to the other nodes in the quantum network. The transmitter 205 may be an optical transmitter. However, it is also possible that it is a wired or wireless electronic transmitter.

Figure 4:
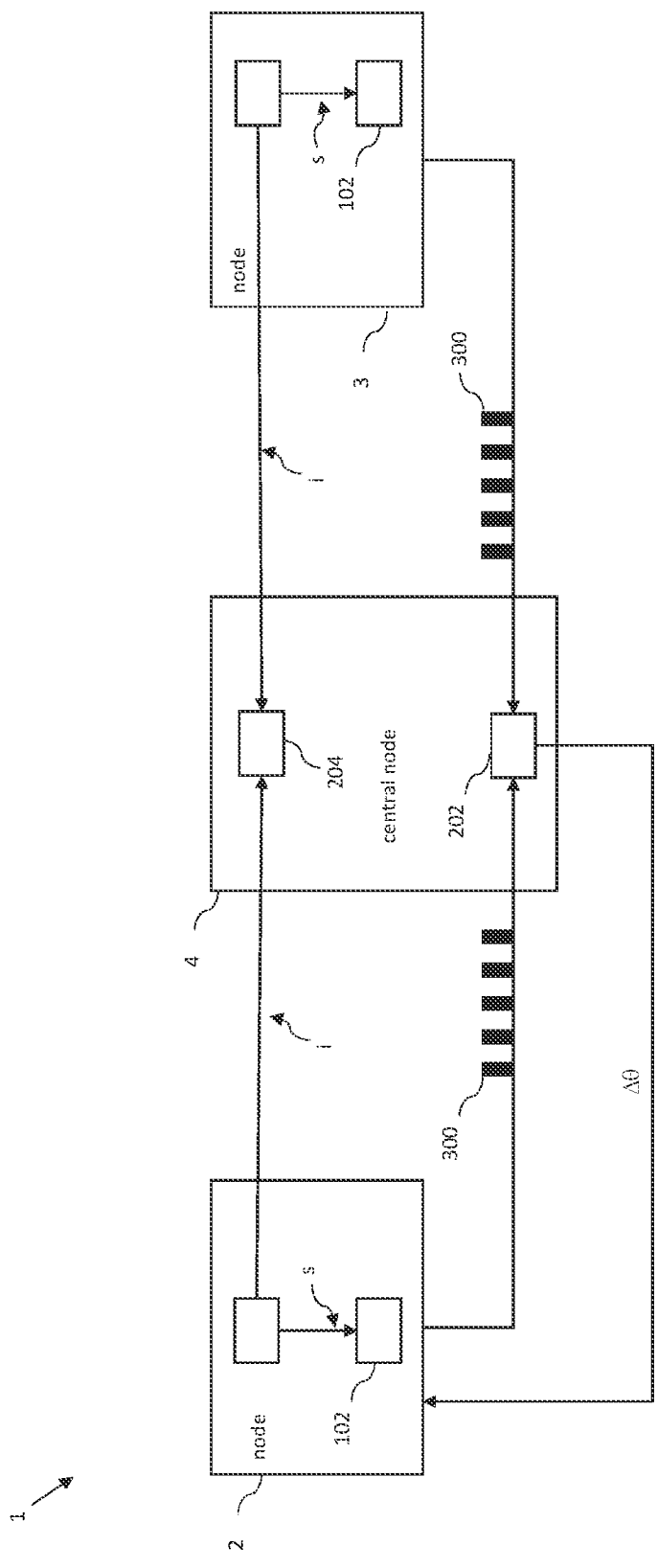
FIG. 4 schematically shows the operation of a one-link quantum repeater.

FIG. 4 schematically shows a method for phase compensation in a quantum network 1. The quantum network may correspond to the quantum network 1 illustrated in FIG. 1. The nodes 2 and 3 may be nodes as illustrated in FIG. 2. The central node 4 may be a central node as illustrated in FIG. 3.

The nodes 2 and 3 each generate entangled pairs comprising quantum information carriers, s and i. The respective quantum carriers i from each node 2 and 3 are transferred to the central node 4. The respective quantum carriers s are stored at their respective node in quantum memories 102. The nodes 2 and 3 also generate pulses of classical light 300. The pulses of classical light 300 are transmitted from the nodes 2 and 3 to the central node 4. While the transmission paths for the pulses 300 and the quantum information carrier i are shown as separate paths in FIG. 4 for the sake of clarity, it should be noted that the same transmission path is preferably used for the pulses 300 and the quantum information carrier i. In particular, the classical pulses 300 and the quantum information carrier i are transmitted from node 2 to the central node 4 via the same optical fiber or the same free space link. Analogously, the classical pulses 300 and the quantum information carrier i are transmitted from node 3 to the central node 4 via the same optical fiber or the same free space link.

The central node 4 determines a relative phase $\Delta\theta$ between the classical pulses 300 from node 2 and the classical pulses from node 3. The central node 4 further determines the result of a Bell state measurement of the quantum information carrier i from node 2 and the quantum information carrier i from node 3.

The central node 4 transmits information about the relative phase $\Delta\theta$ to one of the nodes, in the illustrated embodiment to node 2. The central node further communicates the result of the Bell state measurement to the nodes 2 and 3.

The node 2 receives information about the relative phase $\Delta\theta$ from the central node 4. The node 2 can then apply a phase correction to the quantum information carrier s based on the information about the relative phase $\Delta\theta$.

Figure 5:
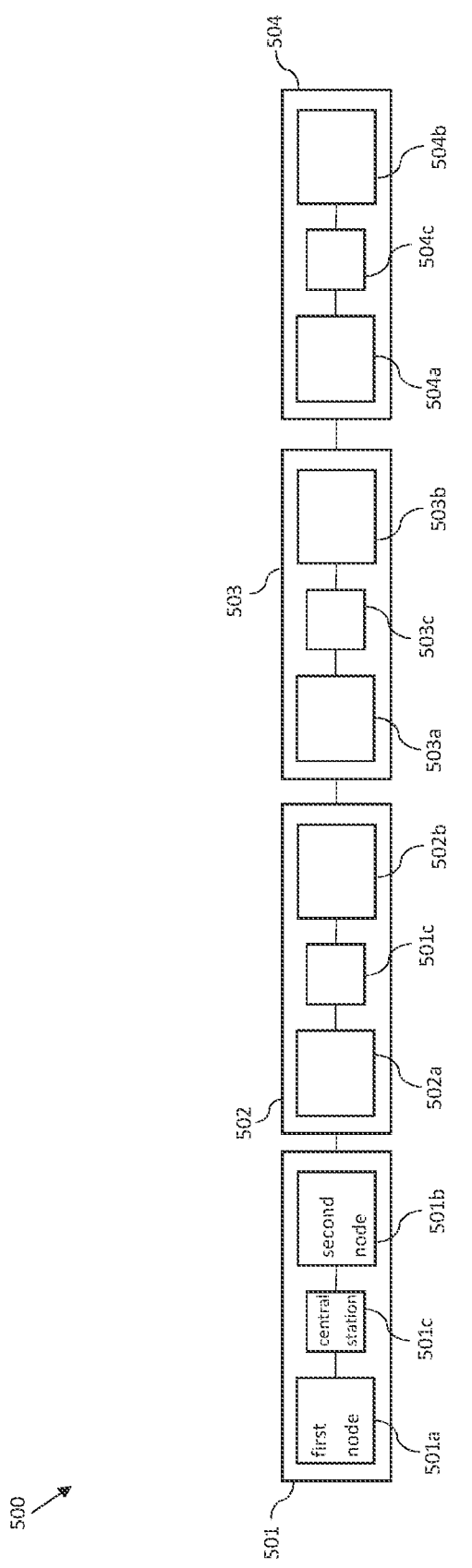
FIG. 5 schematically shows a quantum network.

FIG. 5 schematically shows another embodiment of a quantum network 500. The illustrated quantum network 500 comprises one-link quantum repeaters 501, 502, 503, and 504. However, it is to be understood that the number of one-link quantum repeaters in the quantum network 500 is not limited to four. The quantum network 500 can comprise an arbitrary number of one-link quantum repeaters. The one-link quantum repeater 501 comprises a first node 501a, a second node 501b, and a central station 501c. Analogously, the one-link quantum repeater 502 comprises a first node 502a, a second node 502b, and a central station 502c. The one-link quantum repeater 503 comprises a first node 503a, a second node 503b, and a central station 503c, and the the one-link quantum repeater 504 comprises a first node 504a, a second node 504b, and a central station 504c. One or more of the respective first and second nodes may be nodes as illustrated in FIG. 2. One or more of the respective central stations may be a central node as illustrated in FIG. 3.

The one-link quantum repeaters are connected. In particular, there is a link between the second node 501b of one-link quantum repeater 501 and the first node 502a of one-link quantum repeater 502. The link can be a direct link, for example if the nodes 501b and 502a are located at the same location. It is, however, also possible that the nodes 501b and 502a are connected via an additional central station (not shown). The additional central station may be a central node as illustrated in FIG. 3. At any rate, the connection enables Bell state measurements using quantum information carriers stored at the nodes 501b and 502a.

The remaining one-link quantum repeaters are connected in an analogous way to one another. In other words, it is possible to perform Bell state measurements using quantum information carriers stored at the nodes 502b and 503a, and at the nodes 503b and 504a.

In operation, the quantum information carriers stored in the first and second nodes of each one-link quantum repeater 501, 502, 503, and 504 are entangled. After this, a Bell state measurement is performed using the quantum information carriers stored at the nodes 501b and 502a, such that the quantum information carriers at the first node 501a and the second node 502b become entangled. Then, a Bell state measurement is performed using the quantum information carriers stored at the nodes 502b and 503a, such that the quantum information carriers at the first node 501a and the second node 503b become entangled. Finally, a Bell state measurement is performed using the quantum information carriers stored at the nodes 503b and 504a, such that the quantum information carriers at the first node 501a and the second node 504b become entangled. Thus, the quantum information carriers at the first node 501a and the last node 504b of the network are entangled and can be used for quantum communication. It is noted that the described entanglement procedures do not all have to be performed sequentially. For example, it is possible that the procedure to entangle the quantum information carriers at the first node 501a and the second node 502b is carried out simultaneously with the procedure to entangle the quantum information carriers stored at the nodes 503b and 504a. In this case, the procedure to entangle the quantum information carriers stored at the nodes 502b and 503a will directly result in an entanglement between the quantum information carriers stored at the first node 501a and the last node 504b.

Further, the central stations 501c, 502c, 503c, and 504c, as well as any additional central stations, may continuously perform interferometry measurements to determine phase corrections as described above with reference to FIG. 3. The measured phase corrections may either be applied at the respective first and second nodes of each one-link quantum repeater. However, it is also possible that the phase corrections of each station are tracked and aggregated centrally, and then applied only at the first node 501a and/or the last node 504b.

While the quantum network 500 shown in FIG. 5 illustrates a chain-like topology of the network, it is understood that this topology is merely illustrative. Other topologies, such as star topologies, ring topologies, mesh topologies or the like are also possible topologies for the quantum network 500.

Although the previously discussed embodiments and examples of the present invention have been described separately, it is to be understood that some or all of the above-described features can also be combined in different ways. The above discussed embodiments are particularly not intended as limitations, but serve as examples, illustrating features and advantages of the invention.

The project leading to this application has received funding from the European Union's Horizon 2020 research and innovation programme under grant agreement No 820445 and from the European Regional Development Funds (ERDF) allocated to the Programa operatiu FEDER de Catalunya 2014-2020, with the support of the Secretaria d'Universitats i Recerca of the Departament d'Empresa i Coneixement of the Generalitat de Catalunya for emerging technology clusters devoted to the valorization and transfer of research results (QuantumCAT 001-P-001644).

The invention claimed is:

1. Apparatus for quantum communication in a quantum network configured to:
    create an entangled pair of quantum information carriers comprising a first quantum information carrier and a second quantum information carrier;
    transmit the first quantum information carrier to a remote device;
    store the second quantum information carrier in a quantum memory, wherein the quantum memory comprises a crystal doped with rare earth ions, a solid-state device with point defects, an ensemble of laser-cooled atoms, or a warm vapour;
    receive, from the remote device, information about a phase correction related to a transmission of the first quantum information carrier; and
    apply the phase correction via an electromagnetic pulse to the second quantum information carrier stored in the quantum memory.

2. Apparatus according to claim 1, further configured to:
    apply the phase correction to the second quantum information carrier while the second quantum information carrier is stored in and/or being retrieved from the quantum memory, or
    apply the phase correction to the second quantum information carrier when the second quantum information carrier has been retrieved from the quantum memory.

3. Apparatus according to claim 1, wherein the first quantum information carrier is represented by a photon or a photonic mode.

4. Apparatus according to claim 3, further configured to transmit non-entangled photons to the remote device, wherein the information about the phase correction is determined by the remote device based on the non-entangled photons transmitted from the apparatus to the remote device.

5. Apparatus according to claim 4, wherein a wavelength of the non-entangled photons is determined based on a wavelength of the photon representing the first quantum information carrier, including wherein the wavelength of the non-entangled photons is the wavelength of the photon representing the first quantum information carrier.

6. Apparatus according to claim 5, wherein the apparatus is configured to generate a pair of entangled quantum information carriers and the non-entangled photons using the same means.

7. Apparatus according to claim 6, wherein the apparatus is configured to transmit the first quantum information carrier and the non-entangled photons to the remote device via the same communication channel.

8. Apparatus according to claim 4, wherein the apparatus is configured to send non-entangled photons and first quantum information carriers in an alternating manner.

9. Method for quantum phase compensation in a quantum network comprising:
    creating, by a first device, an entangled pair of quantum information carriers comprising a first quantum information carrier and a second quantum information carrier;
    transmitting, from the first device to a second device, the first quantum information carrier;
    storing, by the first device, the second quantum information carrier in a quantum memory, wherein the quantum memory comprises a crystal doped with rare earth ions, a solid-state device with point defects, an ensemble of laser-cooled atoms, or a warm vapour;
    receiving, by the first device, information about a phase correction related to the transmission of the first quantum information carrier; and
    applying, by the first device, the phase correction via an electromagnetic pulse to the second quantum information carrier stored in the quantum memory.

10. Method according to claim 9, wherein applying the phase correction to the second quantum information carrier comprises:
    applying the phase correction to the second quantum information carrier while the second quantum information carrier is stored in and/or being retrieved from the quantum memory, or
    applying the phase correction to the entangled quantum information carrier after the second quantum information carrier has been retrieved from the quantum memory.

11. Method according to claim 9, wherein the first quantum information carrier is represented by a photon or a photonic mode.

12. Method according to claim 11, further comprising:
    transmitting, from the first device to the second device, non-entangled photons; and
    determining, by the second device, the information about the phase correction based on the non-entangled photons transmitted from the first device to the second device.

13. Method according to claim 12, wherein a wavelength of the non-entangled photons is determined based on a wavelength of the photon representing the first quantum information carrier, wherein the wavelength of the non-entangled photons is the wavelength of the photon representing the first entangled quantum information carrier, wherein a pair of entangled quantum information carriers and the non-entangled photons are generated using the same means.

14. Method according to claim 11, wherein the first quantum information carrier and the non-entangled photons are transmitted from the first device to the second device via the same communication channel.

15. Method according to claim 11, further comprising sending non-entangled photons and first quantum information carriers in an alternating manner.

16. System for quantum communication comprising at least one one-link quantum repeater, the one-link quantum repeater comprising:
    a first apparatus according to claim 1 as a first node of the one-link quantum repeater;
    a second apparatus according to claim 1 as a second node of the one-link quantum repeater; and
    a device as a central station of the one-link quantum repeater, the device configured to:
        receive non-entangled photons from the first node and the second node;
        perform an interferometry measurement using the non-entangled photons received from the first node and the second node;
        transmit a result of the interferometry measurement to the first node and/or the second node;
        receive a first quantum information carrier from the first node;
        receive a second quantum information carrier from the second node; and
        perform a Bell state measurement using the first and/or second quantum information carriers.

17. System according to claim 16, comprising a plurality of connected one-link quantum repeaters, wherein the plurality of one-link quantum repeaters is arranged in a chain, wherein the system is configured to:
- a) perform entanglement procedure to entangle quantum information carriers stored at the first node and the second node of each one-link quantum repeater in the chain,
- b) perform an entanglement swapping procedure to entangle the quantum information carrier stored in the first node of a first one-link quantum repeater in the chain with a quantum information carrier stored in the second node of a neighboring one-link quantum repeater, and
- c) repeat step b) until the quantum information carrier stored in the first node of the first one-link quantum repeater in the chain is entangled with the quantum information carrier stored in the second node of the last one-link quantum repeater in the chain.

18. System according to claim 17, wherein the system is configured to:
- determine an aggregated phase correction based on the interferometry measurement at each central station of each one-link quantum repeater, and
- communicate the aggregated phase correction to the first node of the first one-link quantum repeater in the chain and/or the second node of the last one-link quantum repeater in the chain for phase compensation.

19. Apparatus for quantum communication in a quantum network configured to:
- create an entangled pair of quantum information carriers comprising a first quantum information carrier and a second quantum information carrier;
- transmit the first quantum information carrier to a remote device;
- store the second quantum information carrier in a quantum memory, wherein the quantum memory comprises a crystal doped with rare earth ions, a solid-state device with point defects, an ensemble of laser-cooled atoms, a warm atomic vapour, or single trapped atoms or ions;
- receive, from the remote device, information about a phase correction related to a transmission of the first quantum information carrier; and
- apply the phase correction via an electromagnetic pulse to the second quantum information carrier stored in the quantum memory.

\* \* \* \* \*